Patented June 8, 1926.

1,587,565

UNITED STATES PATENT OFFICE.

HAROLD UPTON, OF MINNEAPOLIS, MINNESOTA.

COMPOUND FOR PREVENTING AND REMOVING CARBON IN INTERNAL-COMBUSTION ENGINES.

No Drawing.      Application filed October 19, 1922.   Serial No. 595,680.

This invention relates to a compound adapted to be used with internal combustion engines to remove carbon deposits from the explosion chambers thereof and to prevent the formation of such deposits. As is well known, carbon tends to collect in the explosion chambers of such engines upon the walls of the cylinders and pistons and about the spark plugs. Such deposits of carbon interfere with the proper operation of the spark plugs as well as the pistons and give rise to a knocking in the cylinders. Many attempts have been made to produce a compound which can be fed into the engine to prevent the formation of carbon deposits or to remove the same but such attempts have heretofore been fruitless.

It is an object of this invention to provide a compound which can be easily mixed with the fuel and fed into the engine which will remove any carbon deposited therein, prevent the depositing of carbon in the engine and increase the efficiency of the engine.

It is a further object of the invention to provide such a compound consisting of certain chemicals dissolved in water and further mixed with methyl alcohol, which compound can easily be mixed with the fuel.

It is more specifically an object of the invention to provide a compound comprising potassium chlorate and sodium chloride dissolved in water and further mixed with methyl alcohol, together with a small quantity of mirbane oil.

Other objects and advantages of the invention will appear from the following description in which the constituents of the compound and the manner of mixing and using the same are clearly set forth.

In forming the compound, the constituents are taken in the proportions of two-thirds of an ounce of sodium chloride, two-thirds of an ounce of potassium chlorate. The said amounts of these substances are then dissolved in approximately four ounces of water. The said substances are readily soluble in water and have quite an affinity therefor. The solution is then further mixed with substantially twenty-eight ounces if methyl alcohol. Alcohol has quite an affinity for the water, and the same and the constituents dissolved therein are uniformly mixed and distributed with the alcohol. Substantially one ounce of mirbane oil is then added to the mixture. The above amounts of the materials make substantially a quart of the compound.

The percentages of the several ingredients are approximately as follows:

|  | Per cent. |
|---|---|
| Methyl alcohol | 81 |
| Water | 12 |
| Mirbane oil | 3 |
| Potassium chlorate | 2 |
| Sodium chloride | 2 |

After the compound is formed, as described, the same is placed in the gasoline or other fuel in the engine. If the engine contains carbon deposits, the compound is used in the proportions of one-half pint thereof to ten gallons of gasoline. The compound mixes uniformly with the fuel and passes through the carbureter therewith without any disadvantageous action on the carbureter. After the carbon has been thoroughly removed from the engine, the compound is used in the proportions of one-fourth pint to ten gallons of gasoline. The compound is merely placed in the gasoline tank, and, as stated, feeds into the engine with the fuel.

By the use of the compound, the carbon is efficiently cleaned from the engine, its further deposit prevented and the efficiency of the engine increased. The alcohol and water serve the purpose of a carrying medium for the sodium chloride and potassium chlorate. The latter have an oxidizing action when the combustion takes place in the engine and the carbon is thus oxidized. Liberation of the oxygen in the engine cylinders, together with the burning of alcohol adds to the force and efficiency of the explosion. The oil of mirbane used in the compound prevents any objectionable odors and has a lubricating effect in the cylinder. The salt constituents in the compound, in addition to their oxidizing action, also have a mechanical purging action on the oxides and the products of combustion and thus tend to keep the walls of the explosion chamber clean and carry off any of such products with the exhaust.

While it is desirable and preferable to use both sodium chloride and potassium chlorate, one of these may, in some cases, be omitted. The oil of mirbane may in some cases also be omitted.

The compound described has been used with great success, both in removing carbon from the engine and preventing the formation thereof. Applicant believes himself to be the first to produce a successful compound of the nature described which can be easily mixed and fed into the machine with the fuel.

It will, of course, be understood that various changes may be made in the constituents and proportions thereof without departing from the scope of applicant's invention, which, generally stated, consists in the matter shown and described and set forth in the appended claims.

What is claimed is:

1. A carbon remover composition for the purpose described comprising by weight more than sixty per cent of methyl alcohol, less than fifteen per cent of water and relatively small amounts of potassium chlorate and sodium chloride.

2. A carbon remover composition for the purpose described comprising methyl, alcohol, water, potassium chlorate and sodium chloride substantially in the proportions by weight of twenty-eight, four, two-thirds and two-thirds, respectively.

In testimony whereof I affix my signature.

HAROLD UPTON.